(12) United States Patent
Elmegreen et al.

(10) Patent No.: US 8,275,727 B2
(45) Date of Patent: Sep. 25, 2012

(54) HARDWARE ANALOG-DIGITAL NEURAL NETWORKS

(75) Inventors: Bruce G. Elmegreen, Yorktown Heights, NY (US); Ralph Linsker, Yorktown Heights, NY (US); Dennis M. Newns, Yorktown Heights, NY (US); Bipin Rajendran, Yorktown Heights, NY (US); Roger D. Traub, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 12/618,101

(22) Filed: Nov. 13, 2009

(65) Prior Publication Data
US 2011/0119215 A1   May 19, 2011

(51) Int. Cl.
*G06F 15/18* (2006.01)
(52) U.S. Cl. ............................................. 706/26; 706/34
(58) Field of Classification Search .......................... None
See application file for complete search history.

(56) References Cited

U.S. PATENT DOCUMENTS

| | | | |
|---|---|---|---|
| 4,807,168 A * | 2/1989 | Moopenn et al. | ............... 706/37 |
| 5,093,900 A | 3/1992 | Graf | |
| 5,140,531 A | 8/1992 | Engeler | |
| 5,299,286 A | 3/1994 | Imondi et al. | |
| 5,355,435 A * | 10/1994 | DeYong et al. | ................. 706/26 |
| 5,761,383 A | 6/1998 | Engel et al. | |
| 6,292,125 B1 | 9/2001 | Conroy | |
| 6,708,159 B2 | 3/2004 | Kadri | |

FOREIGN PATENT DOCUMENTS

| WO | 9634344 A1 | 10/1996 |
|---|---|---|
| WO | 2007088706 A1 | 8/2007 |

OTHER PUBLICATIONS

Coi et al., "VLSI design compact high-precision analog neural network processors"; IEEE 1992.

* cited by examiner

*Primary Examiner* — Alan Chen
(74) *Attorney, Agent, or Firm* — Cantor Colburn LLP; Vazken Alexanian

(57) ABSTRACT

An analog-digital crosspoint-network includes a plurality of rows and columns, a plurality of synaptic nodes, each synaptic node of the plurality of synaptic nodes disposed at an intersection of a row and column of the plurality of rows and columns, wherein each synaptic node of the plurality of synaptic nodes includes a weight associated therewith, a column controller associated with each column of the plurality of columns, wherein each column controller is disposed to enable a weight change at a synaptic node in communication with said column controller, and a row controller associated with each row of the plurality of rows, wherein each row controller is disposed to control a weight change at a synaptic node in communication with said row controller.

17 Claims, 11 Drawing Sheets

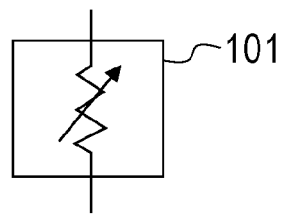
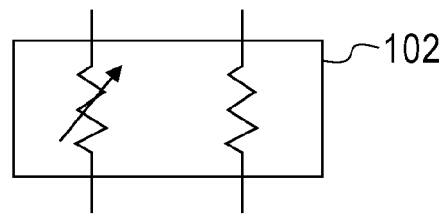
FIG. 1A　　　　　FIG. 1B
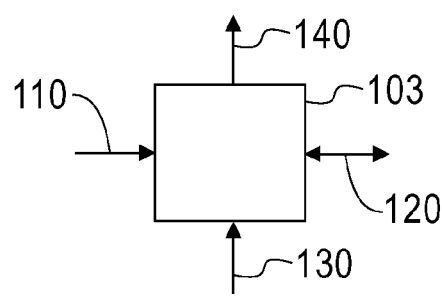
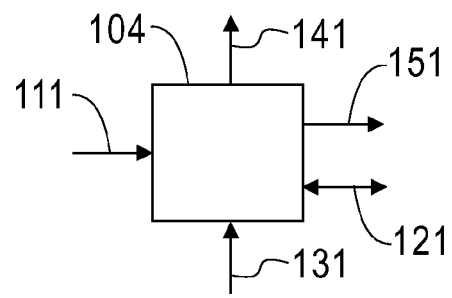
FIG. 1C　　　　　FIG. 1D
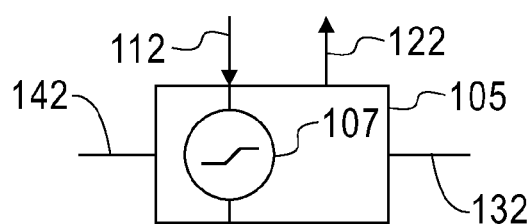
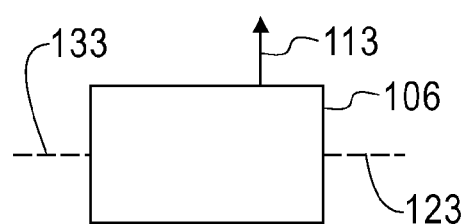
FIG. 1E　　　　　FIG. 1F

HARDWARE ANALOG-DIGITAL NEURAL NETWORKS

BACKGROUND

1. Field

This application relates to neural networks, and in particular, to hardware implemented analog-digital neural networks implemented in both two and three dimensions.

2. Background

Neural networks (NNs) are widely used in pattern recognition and classification, with many potential applications to fingerprint, iris, and face recognition, target acquisition, etc. The parameters (e.g., 'synaptic weights') of the NN are adaptively trained on a set of patterns during a learning process, following which the NN is able to recognize or classify patterns of the same kind.

A key component of a NN is the 'synapse,' at which weight information is stored, typically as a continuous-valued variable. For applications that would benefit from compact, high-performance, low-power, portable NN computation, it is desirable to be able to construct high-density hardware NNs having a large number ($10^9$-$10^{10}$ or more) of synapses. Currently a NN is typically realized as a software algorithm implemented on a general-purpose computer, which is bulkier and operates at higher power than the hardware NN disclosed herein.

Neural networks may be used for three broad types of learning. In "supervised learning" a set of (input, desired output) pairs is provided to the network, one at a time, and the learning algorithm finds values of the "weights" (the adjustable parameters of the network) that minimize a measure of the difference between the actual and the desired outputs over the training set. If the network has been well trained, it will then process a novel (previously unseen) input to yield an output that is similar to the desired output for that novel input. That is, the network will have learned certain patterns that relate input to desired output, and generalized this learning to novel inputs.

In "unsupervised learning," a set of inputs (without "desired outputs") is provided to the network, along with a criterion that the network is to optimize. An example of such a criterion is that the network be able to compress the input into a smaller amount of information (a "code") in such a way that the code can be used to reconstruct the input with minimum average error. The resulting "auto-encoder" network consists of, in sequence, an input layer, one or more "hidden" layers, a "code" layer (having relatively few neurons), one or more hidden layers, and an output layer having the same number of neurons as the input layer. The entire network is trained as if this were a supervised-learning problem, where the "desired output" is defined to be identical to the input itself.

In a third type of learning, "reinforcement learning," a "reward/penalty" value is provided (by an external "teacher"). The "reward/penalty" value depends upon the input and the network's output. This value is used to adjust the weights (and therefore the network's outputs) so as to increase the average "reward."

NN applications may include pattern recognition, classification, and identification of fingerprints, faces, voiceprints, similar portions of text, similar strings of genetic code, etc.; data compression; prediction of the behavior of a systems; feedback control; estimation of missing data; "cleaning" of noisy data; and function approximation or "curve fitting" in high-dimensional spaces.

In a classification or recognition problem, one wants to extract certain types of features that characterize the input (the input can be visual, auditory, text-based, or of other type), and that are similar for inputs that should be classified in the same way (e.g., two different handwritten digit "2"s, or two images of the same person's face). A properly designed neural network can discover such features (either using supervised or unsupervised learning) even if the particular features of interest have not been specified by the user; the NN can represent those features by the network's weight values; and the NN can then use these features to compute an output classification or identification for a previously unseen input.

For example, consider a face recognition application. A neural network would be used to learn a relatively small set of characteristic features, and then to compute a "feature vector," which is a set of numbers for each image. The learning method should have the property that the resulting feature vectors for two images that have the same classification (e.g., that correspond to the same person's face in different poses) are similar to each other. After training has been done, a novel image is processed by the network to yield its feature vector. This feature vector is compared with an already-stored list of feature vectors, and the stored vectors to which the novel vector is most similar yield a list of "most likely matches" to the novel image. The final comparison can be done using non-NN postprocessing. Alternatively, the NN can have an output layer (following the "feature" layer) comprising one "neuron" for each output class. The latter alternative would preferably be used when the number of classes is small (e.g., the ten digits in a handwritten digit recognition task).

Thus a NN can be used as part of a search process, especially one in which the set of characteristic features is not known in advance. For another example, there are methods for document search in which a document is preprocessed to extract the most distinctive words contained therein (e.g., those that are common in the document, but uncommon in the total corpus). Using a vector of values corresponding to this set of most-distinctive words as input to a NN, the NN can be trained to produce similar (or the same) classification outputs for documents whose inputs overlap significantly. The output may take the form of clusters of points, one for each document, where the documents in each cluster are about the same topic, and different clusters correspond to different topics. Thus a search that uses the NN's output can reveal other documents on the same topic in the corpus.

More generally, NNs can be used as embedded components of larger systems that include (non-NN) preprocessing and postprocessing steps.

Another NN protocol would be to deal with an incoming picture P at location Q requiring recognition amongst a large centrally-stored database of M similar-format pictures. The picture is sent from Q to the database. The database is linked to a large number N of the analog-digital feedforward neural network (ADFFNN) chips disclosed herein. All of these chips are trained simultaneously on P, as described herein, so that they recognize P. Then the whole database content is run through the ADFFNN chips in parallel read mode, each chip accepting M/N pictures to read. Any output from recognition events by the chips is returned to Q. If the number of chips, N, is large enough, then the process can be done in an acceptable time. The chips are kept busy by a time-sequence of inputs from various locations Qn.

Disclosed herein are designs for NNs on a chip or integrated device that contain analog networks combined with digital communication, processing and storage functions which may overcome the inefficiencies of conventional neural networks implemented in software-based systems.

SUMMARY

An analog-digital crosspoint-network includes a plurality of rows and columns, a plurality of synaptic nodes, each synaptic node of the plurality of synaptic nodes disposed at an intersection of a row and column of the plurality of rows and columns, wherein each synaptic node of the plurality of synaptic nodes includes a weight associated therewith; a column controller associated with each column of the plurality of columns, wherein each column controller is disposed to enable a weight change at a synaptic node in communication with said column controller; and a row controller associated with each row of the plurality of rows, wherein each row controller is disposed to control a weight change at a synaptic node in communication with said row controller.

BRIEF DESCRIPTION OF THE SEVERAL VIEWS OF THE DRAWINGS

FIGS. 1A-1F are diagrams of a plurality of synapses and synapse controllers, according to an example embodiment;

DETAILED DESCRIPTION

Figure 2:
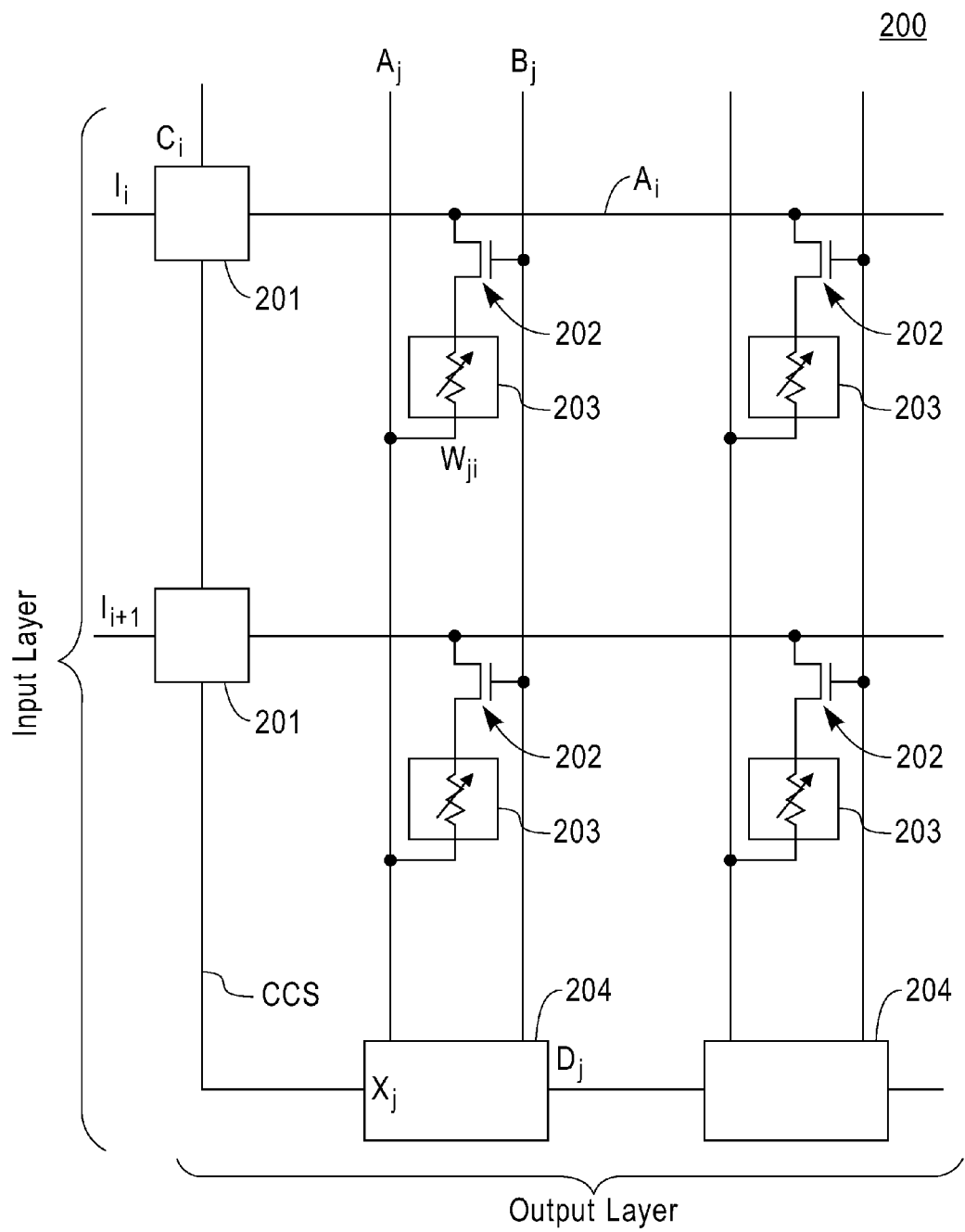
FIG. 2 is a diagram of an example two-layer neural network, according to an example embodiment.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments will be described with reference to the attached drawings.

According to example embodiments, a basic layout of hardware-implemented neural networks (NN) consist of a set of regularly-spaced "x" and "y" lines intersecting at synaptic nodes. A synaptic node may consist of a programmable analog or multilevel resistor, which may preferably be non-volatile. In at least one example embodiment, this functionality may be realized by a phase change material (PCM) device, which, if necessary, may be programmed with feedback. The read/write functionality may be achieved by the presence of compact controller logic units each having 4-5 or more bits, each attached to an "x" and "y" line running along edges of the array of synaptic nodes. The controllers have functionalities including analog-to-digital (A/D) inputs, digital-to-analog (D/A) outputs, storage for several numbers each having 4-5 or more bits, digital I/O lines, and nonlinear sigmoid-type outputs.

Example embodiments provide the capability to reliably implement weight changes during learning, using multilevel programming of each synaptic resistance unit, and using the functional capability of the controllers to program the synaptic levels, while maintaining very compact synapse structures (e.g. a PCM element plus one to three transistors, depending upon a desired configuration). For example, using 30 nm technology, a synaptic density of $3.6 \times 10^9$ cm$^{-2}$ may be achieved, with $6 \times 10^4$ controllers attached to each x-line and each y-line. The controllers may consist of $10^4$ or more transistors. The energy required per synapse per step (i.e., per weight change, as described below) is several pico-Joules (pJ). For each presentation of an input image to the NN during learning, the desired weight updates at all the synapses may be performed in a time on the order of 0.02 sec. During the recognition stage (i.e., following synapse training), the energy consumption and recognition time per image may be reduced.

Hereinafter, an Analog/Digital Feed-forward Neural Net (ADFFNN) is described in detail. It is noted that as used herein, the term "layer" may refer to two forms of layers. The term "layer" may refer to a layer of neurons in a neural network viewed as a mathematical system (independent of implementation). For example, in a feedforward neural network, two adjacent layers of neurons are connected by a feedforward set of synaptic connections. The term "layer" may also refer to a physical layer of a multilayer circuit structure. Examples of a multilayer circuit structure include, but are not limited to, a semiconductor chip, and a three-dimensional multi-chip stack or package. The use of the term "layer" is made clear by its context wherever it is used herein.

According to an example embodiment, an ADFFNN may include an input layer and an output layer. Example embodiments are described with reference to synaptic memory consisting of a PCM resistance, but any programmable multilevel resistance device whose programmable conductance values are approximately evenly spaced may be substituted.

FIG. 1A illustrates a synapse 101. The synapse 101 consists of a resistive element forming a two-terminal device. The resistance of the resistive element is variable, its value depending on the voltage input from programming pulses provided by a controller. In the case of PCM material the resistance of the PCM is increased by a short, high power, RESET pulse. The RESET pulse raises the PCM temperature to above its melting point, and then on turnoff the PCM temperature rapidly drops, resulting in the PCM taking on a glassy or amorphous state with a semiconducting-type resistivity. The resistance of the PCM can be lowered by applying a SET pulse, which is a lower-power pulse that typically lasts longer than the RESET pulse. The SET pulse anneals the sample back to a wholly or partially crystalline state, which has the resistivity of a poor metal. The two terminals connected through the PCM form both the program and the sense terminals of the device.

FIG. 1B illustrates a synapse 102. The synapse 102 may be an externally heated PCM element consisting of two resistive elements which are electrically isolated but thermally coupled, forming a 4-terminal device. One resistance, formed of PCM material, is variable, its value depending on the heat input from programming pulses provided by the second (e.g., programming) resistor, which may consist of a refractory material. The two terminals connected through the PCM form the sense terminals of the device, while the two terminals connected through the refractory resistor form the programming terminals of the device.

In some four-terminal synapses, by applying SET pulses of different strengths, the sensed resistivity can be controlled over a range of values, allowing multistate information storage in such a device.

FIGS. 1C and 1D define the symbols for the compact controller logic units described herein which may be attached to an x-line at the edge of the array of synaptic nodes. In FIG. 1C, the controller 103 includes two (2) analog inputs (110, 120), an analog output (also 120), and digital inputs and outputs for a Controller Communication System (CCS, 130, 140). In FIG. 1D, the controller 104 includes the similar inputs and outputs as controller 103, and further includes a row enable line 151. Thus the controller 104 includes two (2) analog inputs (111, 121), an analog output (also 121), digital inputs and outputs for a Controller Communication System (CCS, 131, 141), and a row enable line (151). Both controllers 103 and 104 include storage for several numbers each having several (i.e., 4-5 or more) bits.

FIG. 1E depicts an output compact controller logic unit 105, which may be attached to a y-line at the edge of the array of synaptic nodes (line 112). The unit 105 includes a nonlinear sigmoid-output amplifier 107 (this smaller symbol is omitted from the network diagrams below for simplicity and to increase the legibility of the drawings). The amplifier takes an analog current I as input and outputs a voltage V that is a monotonically increasing, non-linear function. For example, this increase may be based on a non-linear function such as $V=\tan h(bI)$ or $V=a/(1+\exp(-bI))$, where a and b are constants. Line 112 is an analog current input or a line to zero the voltage during the read-weight stage of operation. Line 122 is a column select. Lines 132 and 142 are digital inputs and outputs, respectively, to the CCS.

FIG. 1F depicts a compact controller unit 106 which selects columns during read and write cycles of a multi-bit synapse formed from conductors with values proportional to powers of 2. The controller 106 includes an analog output 113, and digital inputs and outputs for a Controller Communication System (CCS, 123, 133).

FIG. 2 illustrates a schematic of a circuit diagram for a two-layer ADFFNN using two-terminal synapses. The wiring matrix consists of one x-line, $A_i$, per row i, and two y-lines, $A_j$ and $B_j$, per column j. The lines $A_i$ and $A_j$ connect through the synapse FET 202 and the multilevel resistance element 203. The conductance connecting lines $A_i$ and $A_j$ is the weight $w_{ji}$ of the synapse at that intersection. The control line, $B_j$, connects to the FET 202 at each synapse in the column and thereby controls the column operation. The read/write and learning operations of FIG. 2 will be described in more detail below.

FIG. 3 illustrates a schematic of a circuit diagram for a two-layer ADFFNN, in which each synapse consists of a circuit of several programmable elements (301, 302, 303 in parallel (it is noted that the CCS described above is not depicted in FIG. 3, although still implemented). Each programmable element (301, 302, 303) in FIG. 3, for example a PCM, is set either to an effectively zero conductance or a maximum conductance that scales as a power of 2. By turning each programmable element on or off, one can realize any of a set of linearly-spaced values. A similar circuit can be made for 4-terminal synapses.

Figure 3:
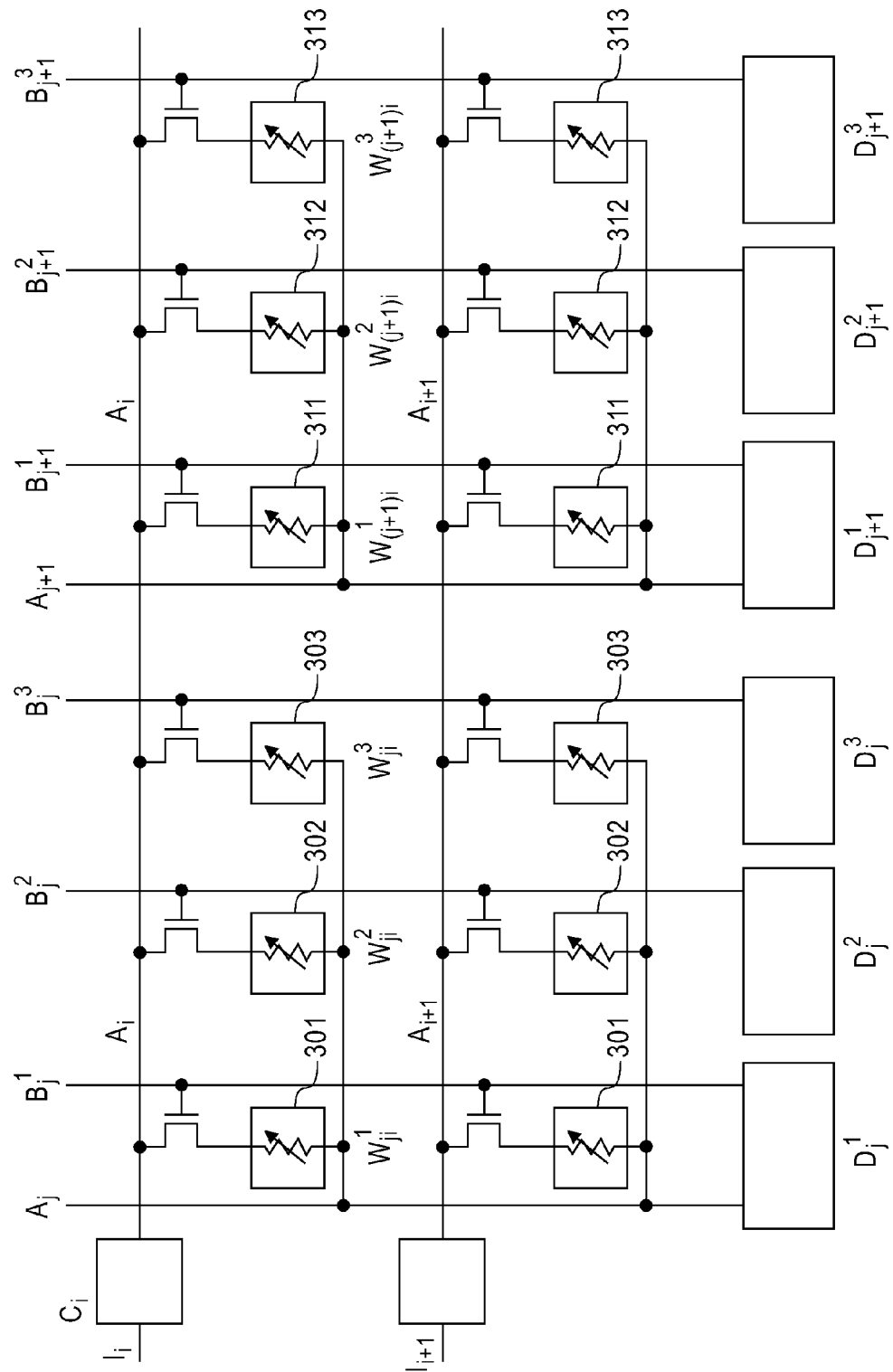
FIG. 3 is a diagram of an example feed-forward neural network, according to an example embodiment.
Figure 4:
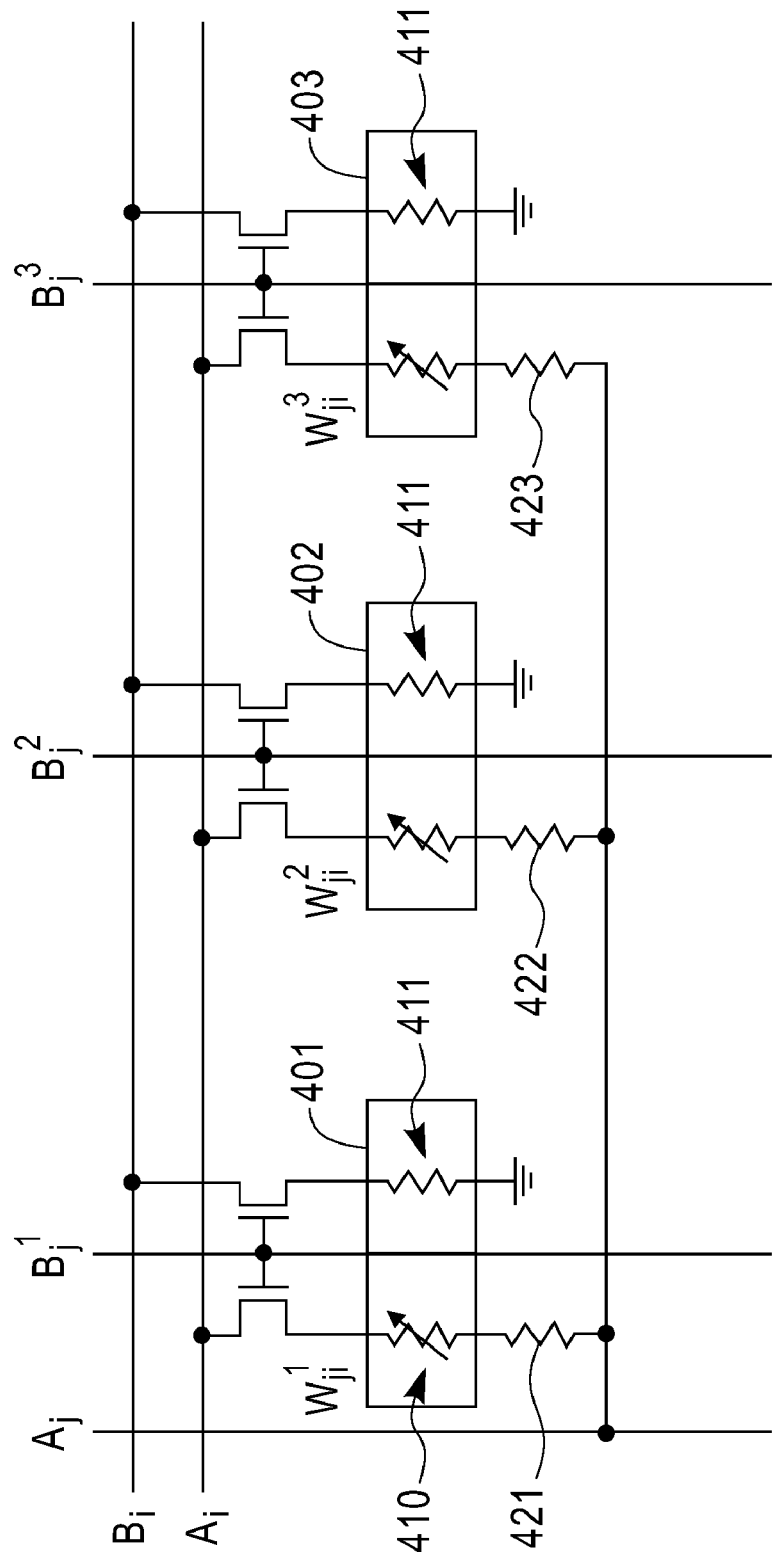
FIG. 4 is a diagram of an example feed-forward neural network, according to an example embodiment.

FIG. 4 is similar to FIG. 3, except that each programmable element (401, 402, 403) consists of a fixed-value resistor (421, 422, 423 respectively) in series with a variable conductance element 410 (e.g., a PCM), in which the fixed-value conductance(s) have values in the ratios 1:2:4 etc., and the variable conductance elements can be set either to (effectively) zero conductance or to a maximum conductance whose value is the same for all elements. The advantage is that the PCM's need only to be ON or OFF in order to implement the multi-valued three (or more) bit synaptic weight. According to the layout of FIG. 4, the programming of each PCM may be performed using a SET/RESET signal, and does not require feedback. Resistors 411 are the programming elements that turn the respective associated PCMs ON or OFF. If programming the weights, columns $B^1_j$, $B^2_j$, etc., in FIG. 4, are turned on in sequence by the column controller. Further details on the read/write and learning sequences of FIG. 3-4 will be described more fully below.

Figure 5:
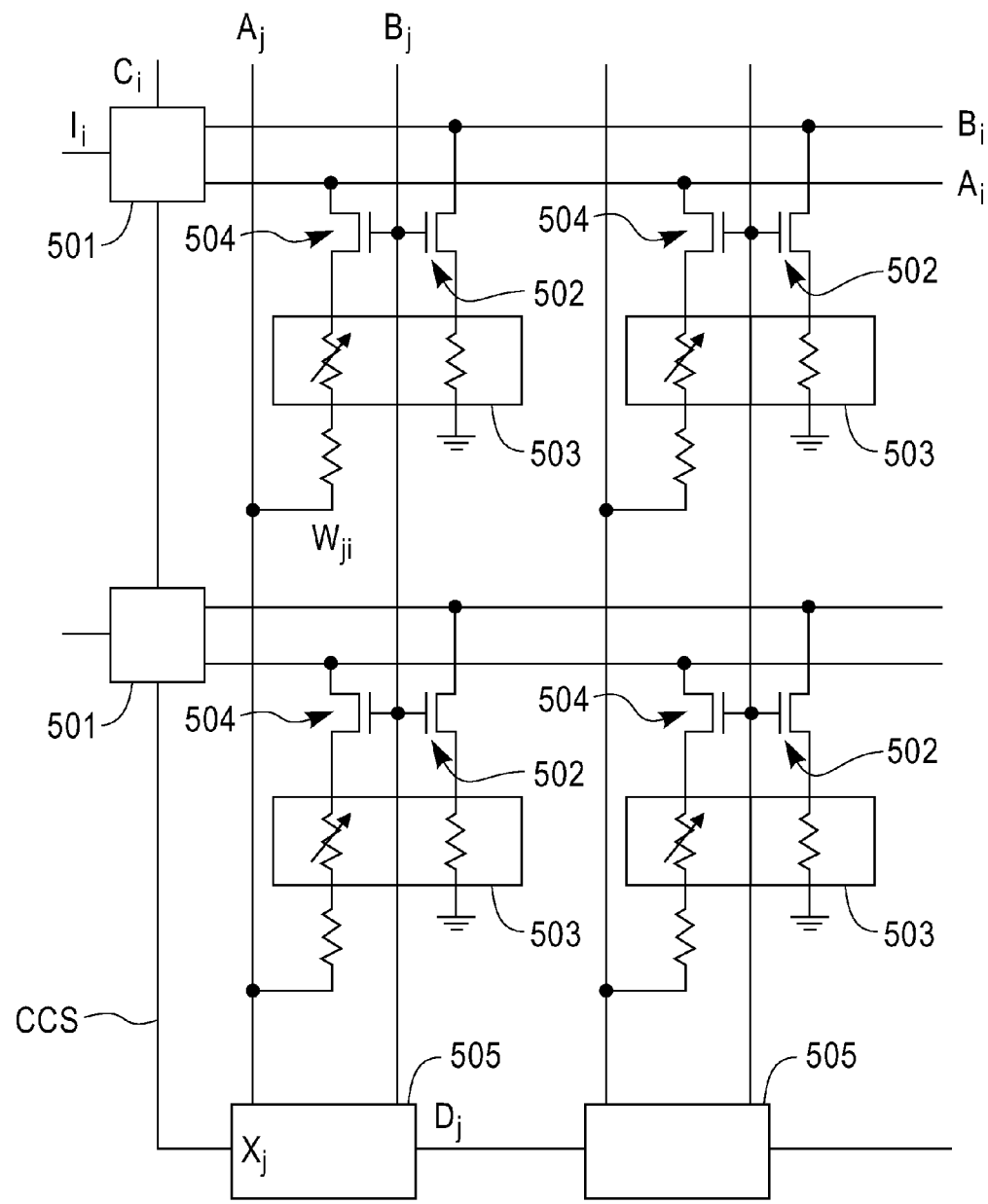
FIG. 5 is a diagram of a two-layer neural network, according to an example embodiment.

FIG. 5 illustrates a basic circuit diagram for a two-layer ADFFNN using four-terminal synapses containing two-terminal PCM or other material requiring two additional terminals for programming. The wiring matrix consists of two x-lines, $A_i$ and $B_i$, per row i, and two y-lines, $A_j$ and $B_j$, per column j. The sense lines $A_i$ and $A_j$ connect through a sense FET 504 and the PCM element. The conductance connecting lines $A_i$ and $A_j$ is the weight $w_{ji}$ of the synapse 503 at that intersection. The row line, $B_i$, controls the programming of the PCM element through a heater, piezoelectric element, or other method. The column line $B_j$ enables the column for read and program functions. The line $B_i$ connects to ground in series through the programming transistor and the programming resistor or piezoelectric element near the PCM. Line $B_i$ is connected to the output of controller $C_i$, which is the programming pulse driver. Column line $B_j$ is connected to controller $D_j$ and to the gates of both the sense 504 and programming FET's 502.

Hereinafter, the learning processes noted above regarding FIGS. 2-5 are described in more detail.

Turning back to FIG. 2, NN learning is described with regards to a Hebbian Learning process. In the learning process, the weights $w_{ji}$ are updated by an amount $\Delta w_{ji}$, given by Equation 1, below:

$$\Delta w_{ji} = \eta I_j \sigma\left(\sum_i w_{ji} I_i\right), \qquad \text{Equation 1}$$

In Equation 1, $\sigma(x)$ is the nonlinear function produced by the sigmoidal amplifier of the column controller(s) 204, $I_i$ is an input voltage of a row controller 201, and $\eta$ is a parameter. The system 200 is configured such that sense lines $A_j$ are connected to the sigmoid output amplifiers of controllers 204, which would output to the controllers 201. Considering a set of input values $\{I_i\}$, presented at a given time to the network, as an 'image'; for example, a set of visual pixel values. The input may be analog or digital. If the input is digital, then it has to be converted to analog before output on line(s) $A_i$. The inputs for a particular image are connected to the row lines $A_i$. A column j is selected via the column enable line $B_j$. The current flowing from column j is $O_j$ given by Equation 2 below:

$$O_j = \sum_i w_{ji} I_i, \qquad \text{Equation 2}$$

In Equation 2, the sum is implemented by conservation of currents. The current $O_j$ is detected by the sigmoid-output amplifier of controller 204, thereafter presenting as output the column output $X_j$ given by Equation 3 below:

$$X_j = \sigma\left(\sum_i w_{ji} I_i\right). \qquad \text{Equation 3}$$

The column output is communicated to the controller 201 where it is stored.

The inputs $I_i$ are also stored in the controllers 201 in digital form. The inputs are converted to digital form if they are originally in analog form. The controller performs the digital product of input $I_i$, the stored input $X_j$, and the parameter $\eta$ to give the updated weight as dictated through Equation 4 below:

$$\Delta w_{ji} = \eta I_i \sigma\left(\sum_i w_{ji} I_i\right) = \eta I_i X_j, \qquad \text{Equation 4}$$

The digital product is stored in the controller 201 in digital form.

It may be necessary to read the value of old weights $w_{ji}$ that are to be updated. Reading may be accomplished through grounding line(s) $A_j$ through a controller $D_j$ and applying a voltage along $A_i$ with a controller $C_i$. The outputs $A_i$ of controllers $C_i$ measure the currents running through the weights $w_{ji}$ and convert these to digital form in the controllers where they are also stored. If these weights are stored in $C_i$ from a previous iteration, then they do not need to be sensed and stored again.

The controller(s) $C_i$ perform the digital operation of computing a new desired weight as shown below in Equation 5:

$$w_{ji}^n = w_{ji}^{n-1} + \Delta w_{ji}. \qquad \text{Equation 5}$$

As shown in Equation 5, the computation of the new desired weight is performed through addition of the stored increment $\Delta w_{ji}$ and the stored weight $w^{n-1}_{ji}$.

An analog signal that is a function of the new desired weight $w^n_{ji}$, may be transmitted along the $A_i$ line with $B_j$ enabled. This reprograms the synapse at junction ji to the new value. This signal may not at first successfully achieve the correct value of the new desired weight, but iteration(s) may be done by reading the newly-adjusted weight again and outputting a new signal along $A_i$ until the weight is sufficiently close to that given by the above formula. By performing this operation for all $C_i$ simultaneously, and stepping through the columns in sequence, all synapses are given new weight values effectively. Thus the write process takes N steps for N controllers (neurons) and $N^2$ synapses.

It is sometimes desirable to use a neural network to compute output values as a function of input values, with the weights already pre-specified or already learned. This mode of operation is called "activation mode" (as opposed to the combination of "activation" plus "learning" modes). When in activation mode, Equations 2 and 3 are computed by the NN, but Equation 1 is not. In this case, all outputs can be computed simultaneously in all columns, instead of requiring that one column at a time be enabled for computation.

Referring to FIGS. 4 and 5 which include four-terminal synapses, the procedure for reading, amplifying, and updating the weights is similar to the process as described above with the exception of the row lines $B_i$ taking the weight-regulation signal from controller $C_i$ and directing it though the programming element (401, 402, 404, 503) of the synapse.

In some implementations, it is may be desired that a given image input to the perceptron produces a specified set of outputs $\zeta_j$. This condition may be approached by minimizing the mean square error signal through equation 6 below:

$$E = \frac{1}{2}\sum_j (\zeta_j - X_j)^2. \qquad \text{Equation 6}$$

The system will evolve, towards reduced E, along the gradient vector of E using the learning rule depicted in Equation 7 below:

$$\Delta w_{ji} = -\eta \frac{\partial E}{\partial w_{ji}} \qquad \text{Equation 7}$$
$$= \eta I_i (\zeta_j - X_j) \sigma'(O_j).$$

In Equation 7, $\sigma'$ represents the derivative of $\sigma$. In order to implement this modified update, the desired outputs $\zeta_j$ can be made available in digital or analog form at the column output stage. Then the nonlinear amplifiers at the column output need to include high-functionality column controllers. The column controllers need to be able to perform the difference ($\zeta_j - X_j$), implement the function $\sigma'(O_j)$, and take the product of these factors. This may be done in analog or digital fashion, with ADC conversion required inside the column controllers for the latter. The weight update is communicated to the controllers as before, and the remainder of the update process is unchanged.

According to additional example embodiments, a Hopfield-type neural network may be implemented in a similar fashion as that for the two-layer ADFFNN described above, except that means are provided by wiring each output line (denoted by a column) $A_j$ to an input line (denoted by a row) $A_i$, where i=j, to repeatedly carry the output signals to the input lines for a new round of computation and learning at the next time step.

According to additional example embodiments, 'multilayer' perceptrons are further provided. Multilayer perceptrons have three or more layers of neurons, and two or more connection stages, with each connection stage joining adjacent pairs of neuron layers, and are capable of solving more difficult recognition and classification problems than a two-layer perceptrons. Multilayer perceptrons may be trained to recognize images by a generalization of the supervised learning algorithm as described above, termed the Back-Propagation Algorithm (BPA). Similar circuit designs to those described above may also be employed to implement a three-layer ADFFNN.

Figure 6:
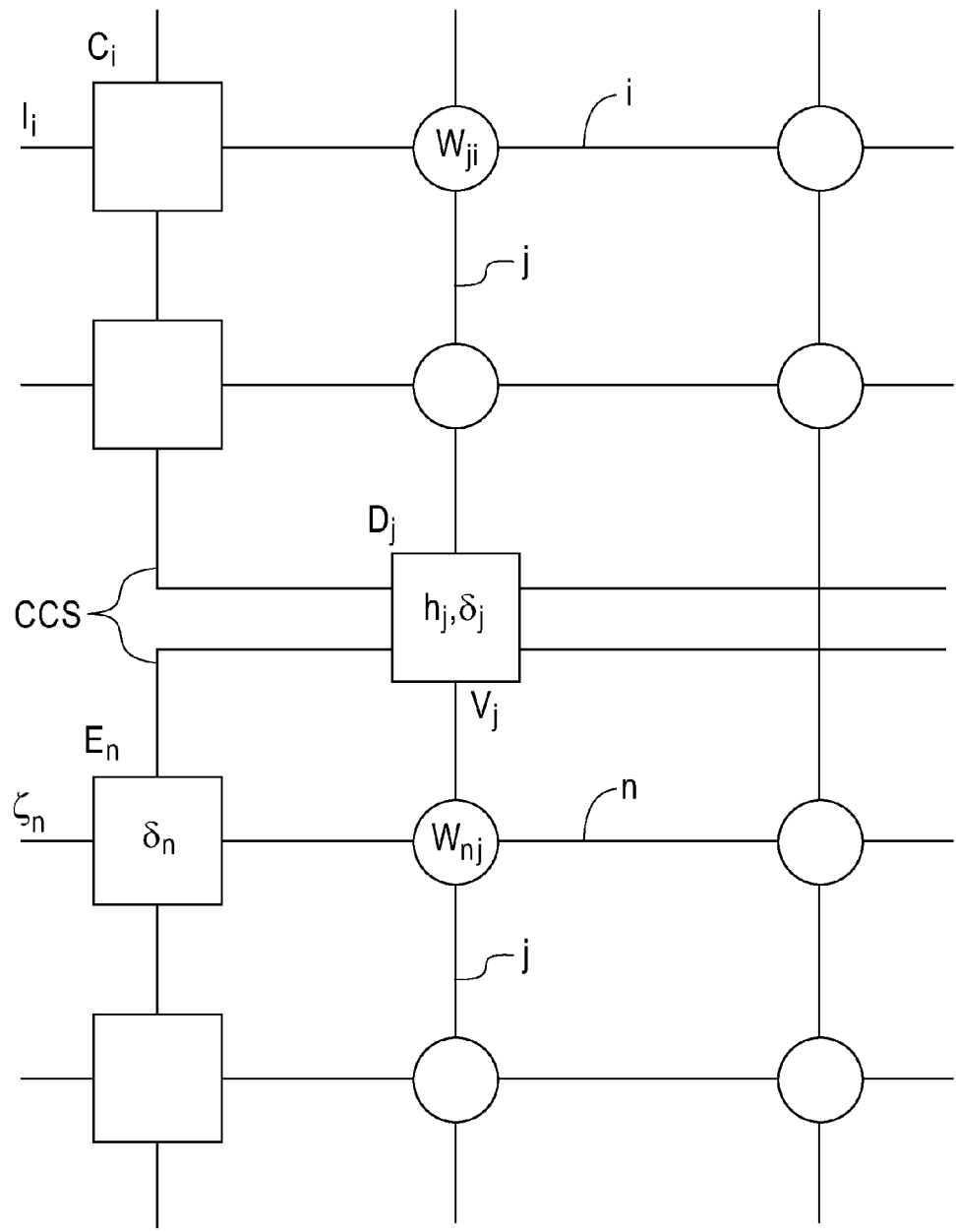
FIG. 6 is a diagram of a three-layer neural network, according to an example embodiment.

For the purpose of simplicity and ease of understanding the figures, a more symbolic notation is utilized in FIG. 6 describing a three-layer perceptron. According to FIG. 6, there are two arrays of synapses. The first array, comprising input synapses, includes x-lines i and y-lines j. The second array, comprising output synapses, includes x-lines n and shares the same y-lines j as the input array. The synaptic weights in the input array are denoted by $w_{ji}$. The synaptic weights in the output array are denoted by $W_{nj}$.

There are 3 layers of controllers (also referred to as neurons), an input layer $C_i$, a hidden layer $D_j$, and an output layer $E_n$. The inputs are voltages $I_i$, there are intermediate outputs $V_j$, and final outputs $\delta_n$. The desired outputs $\zeta_n$ are available at the final outputs if supervised learning is being performed. There is a CCS linking the $D_j$ with the $C_i$ and the $E_n$ controllers.

The basic equations of the backpropagation algorithm (BPA) in a multilayer case may be obtained by extension of the arguments given above for supervised learning in the two-layer perceptron case and are provided below $$h_j = \sum_i w_{ji} I_i, \quad V_j = \sigma(h_j)$$

$$h_n = \sum_j W_{nj} V_j, \quad \delta_n = \sigma'(h_n)[\zeta_n - \sigma(h_n)],$$

leading to the update equations $$\Delta W_{nj} = \eta \delta_n V_j$$

$$H_j = \sum_n \delta_n W_{nj}, \quad \delta_j = \sigma'(h_j) H_j$$

$$\Delta w_{ji} = \eta \delta_j I_i.$$

Equations 8 and 9

It will be recognized that the $V_j$ are generated for the input array in the same manner as the outputs in the two-layer case, while the $\sigma(h_n)$ are generated again in the same way for the output array, with $V_j$ as the inputs.

The updates $\Delta W_{nj}$ for the synaptic weights $W_{nj}$ of the output array are computed in a similar way to those in the supervised learning of the two-layer perceptron. However, the updates $\Delta w_{ji}$ for the synaptic weights $w_{ji}$ of the input array are computed differently. For example, the factor $(\zeta_j - X_j)$, used in the 2-layer case, is replaced by $$\sum_n W_{nj} \delta_n.$$

Thus, the error factor is derived from propagating the output error back through the array of upper-stage weights. The hardware implementation of the BPA can be described in three phases.

In a forward-propagation phase, the inputs $I_i$ are internally connected in the controllers $C_i$ to the x-lines i. The controllers $D_j$ are configured as nonlinear amplifiers with the summed current in column j as input. The inputs $$h_j = \sum_i w_{ji} I_i$$

and outputs $V_j = \sigma(h_j)$ are stored in $D_j$.

Next, each column j is selected in turn. For each j, the controllers $E_n$ are configured as nonlinear amplifiers with the summed current $$h_n = \sum_j W_{nj} V_j$$

in row n as input. The output of $E_n$ is $\sigma(h_n)$. In $E_n$ the available desired outputs are combined with the actual outputs to give the quantities $\delta_n = \sigma'(h_n)[\zeta_n - \sigma(h_n)]$, which are stored in $E_n$.

In a first backward propagation phase, the output array weights $W_{nj}$ are updated. Row n is selected and output $\delta_n$ from $E_n$ is transmitted via CCS to all $D_j$, and stored respectively. Further, $E_n$ is configured as a voltage source with signals proportional to $W_{nj}$ thus being received in $D_j$, where said $W_{nj}$ are stored.

Using locally available values of $W_{nj}$, $V_j$, and $\delta_n$, $\Delta W_{nj} = \eta \delta_n V_j$ is computed in $D_j$, and the new weight value $W_{nj} \rightarrow W_{nj} + \Delta W_{nj}$ is obtained. The synaptic weights in row n are updated by $D_j$ sending reprogramming pulses along column j. The programming can be recursive, as in the two-layer example described above, by repeating the previous step to access the stored $W_{nj}$.

In a second backward-propagation phase, the input array weights $w_{ji}$ are updated. Each column j is selected in turn. For each j, all controllers $E_n$ produce outputs $\delta_n$, giving summed inputs $$H_j = \sum_n \delta_n W_{nj}$$

at $D_j$. Output $\delta_j = \sigma'(h_j) H_j$ from $D_j$ is transmitted via CCS to all $C_i$, and stored therein. Thereafter, an update pulse is transmitted from $C_i$ to the synapses, implementing the update rule $w_{ji} \rightarrow w_{ji} + \Delta w_{ji}$, $\Delta w_{ji} = \eta \delta_j I_i$.

It follows that any number of layers may be connected together in this way, with back propagation from the last layer to the first done sequentially in the manner indicated above for two stages of connections.

A general feedforward+feedback NN may also be realized with the three-layer perceptron design, through omission of the computation of error signals, and recycling of the output signals from the uppermost neuron layer such that they become the input signals at the lowermost neuron layer at the next time step. The rules for updating the weights in the two connection stages will depend on the particular learning algorithm used.

The design of such a network for the special case in which the bottom-up weights and the top-down weights are equal to each other for each pair of neurons is provided herein. For example, consider a layer of input neurons $v_i$, (i.e., v for visible) and a layer of output neurons $h_j$ (i.e., h for hidden), with bottom-up weight $w_{ji}$ from $v_i$ to $h_j$, and top-down weight $w_{ij} = w_{ji}$ from $h_j$ to $v_i$. This corresponds to the notation for the NNs described in detail above, for the special case in which the capital-letter W matrix is the transpose of the lowercase w matrix.

Figure 7:
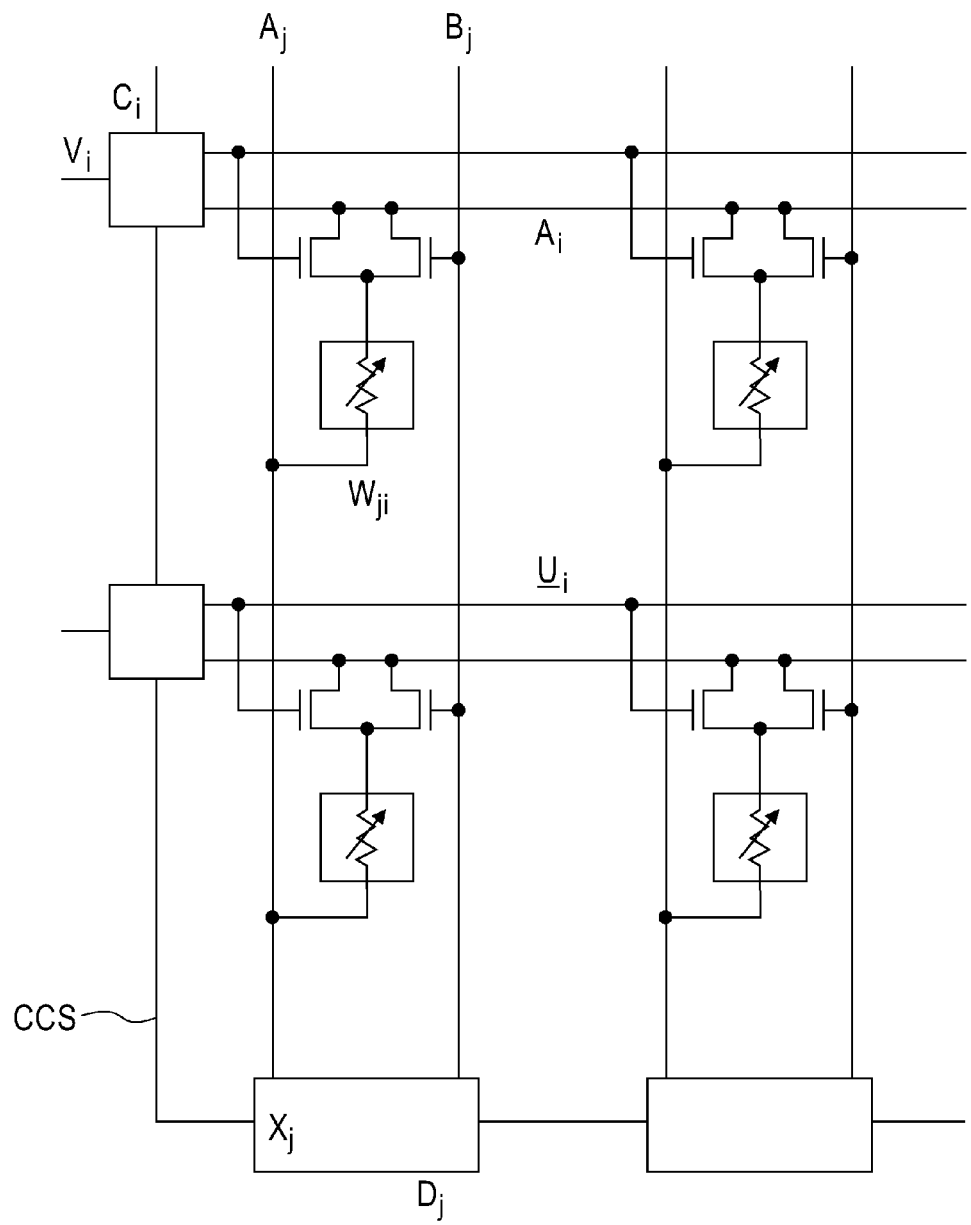
FIG. 7 is an example circuit diagram of a two-layer bidirectional neural network, according to an example embodiment.

The Restricted Boltzmann Machine (RBM) algorithm is described by G. Hinton, S. Osindero, and Y.-W. Teh in "A Fast Learning Algorithm for Deep Belief Nets," Neural Computation, vol. 18, pp. 1527-1554 (2006), the entirety of which is hereby incorporated by reference herein. A hardware implementation of the RBM method, given in FIG. 7, prescribes that the vector of signals at the v-neurons (denoted by v) is processed by the weight matrix w to yield each column j of the vector h. The weights $w_{ji}$ are updated (one column j at a time) by an amount (c $v_i$ $h_j$), where c is a positive number. Further, the vector h is processed using $w^T$ (where T denotes transpose) to yield $\tilde{v}_i$ (an attempted "reconstruction" of v, which will become better as the learning of w proceeds). Further, $\tilde{v}_i$ is processed by the weight matrix w to yield each column j of the vector $\tilde{h}_j$. Finally, the weights $w_{ji}$ are updated (one column j at a time) by an amount ($-c$ $\tilde{v}_i$ $\tilde{h}_j$). The equations 10-12 used for the signal processing are given below:

$$h_j = \sigma\left(\sum_i w_{ji} v_i\right); \quad \text{Equation 10}$$

$$\tilde{v}_{i'} = \sigma\left(\sum_j w_{ji'} h_j\right); \quad \text{Equation 11}$$

$$\tilde{h}_{j'} = \sigma\left(\sum_{i'} w_{j'i'} \tilde{v}_{i'}\right). \quad \text{Equation 12}$$

Note that while the Hinton et al. description of the RBM algorithm updates weight $w_{ji}$ in one step, by an amount proportional to ($v_i h_j - \tilde{v}_i \tilde{h}_j$), example embodiments perform the update in two parts. Thus, in these example embodiments, the weights used to compute $\tilde{v}_i$ and $\tilde{h}_j$ will have already been changed as a result of the first weight update (i.e., the $cv_i h_j$ update) described above. This two-part updating does not significantly alter the results of the algorithm, provided c is sufficiently small. Performing the update in two parts has a significant advantage over computing and storing all the $h_j$, $\tilde{v}_i$ and $\tilde{h}_j$ values and then computing the differences of products; namely, the advantage that only one $h_j$ (or $\tilde{h}_j$) value, rather than all of them, needs to be stored at each row controller at a given time.

Figure 8:
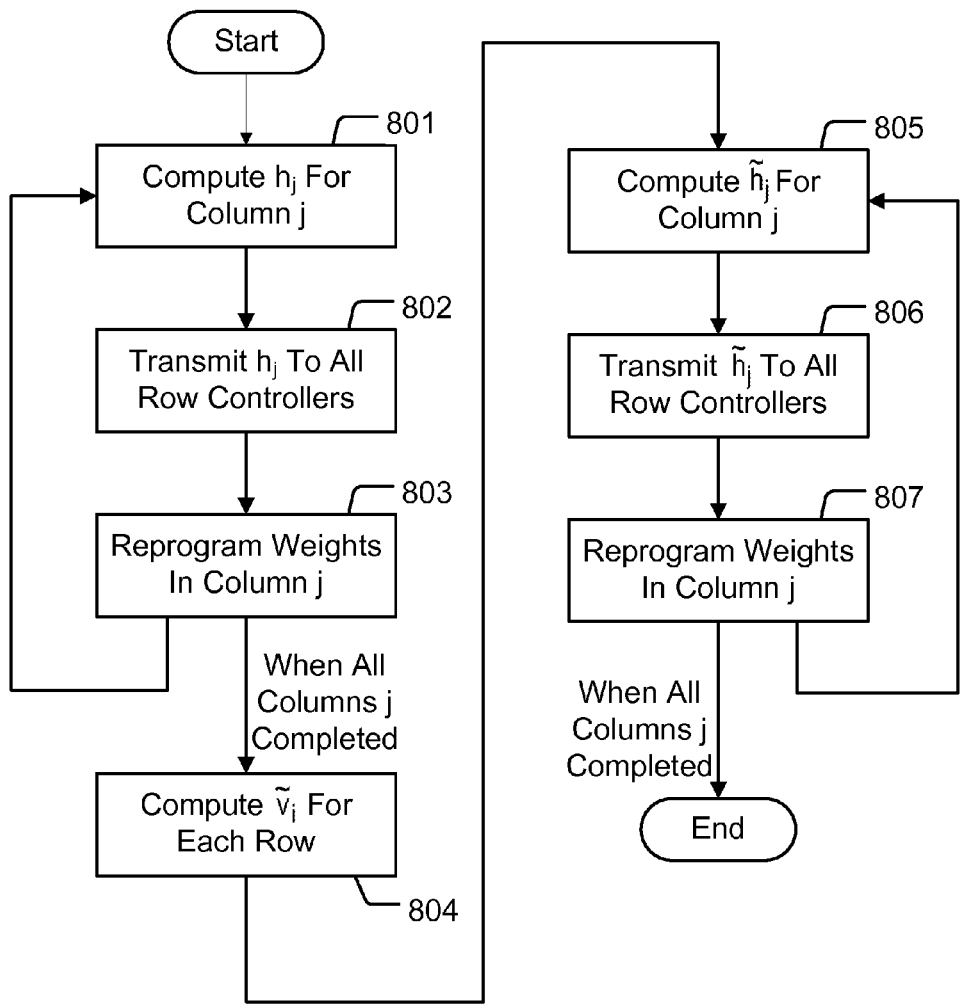
FIG. 8 is a flowchart of a learning method for a neural network, according to an example embodiment.

An array for implementing the RBM algorithm may be derived from the single-stage ADFFNN of FIG. 2 by adding a second, smaller transistor (for read only operations) in parallel with the read/program transistor, and connecting the gates of the second transistor to a row line. An example embodiment of the RBM algorithm described above is given by the circuit of FIG. 7. Further discussion of this example embodiment is provided below with reference to FIG. 8.

The method 800 may be a generalized version of the RBM method described above in detail with reference to FIG. 7. Thus, particular details which are redundant and/or exhaustive are omitted for the sake of brevity.

Turning back to FIG. 8, the method 800 includes computing $h_j$ for column j of a NN at block 801. For example, $h_j$ is computed based on Equation 10 above. Thus, column j is selected (enabled) using line $B_j$. Inputs $v_i$ of a NN are connected to rows $A_i$, and column controller $D_j$ is configured with a nonlinear sigmoid amplifier 107. The weights $w_{ji}$ of the synaptic nodes in column j of the crosspoint network are used to compute the linear combination $$\sum_i w_{ji} v_i.$$

The controller $D_j$ computes the nonlinear function $$h_j = \sigma\left(\sum_i w_{ji} v_i\right).$$

The computed $h_j$ is then stored at $D_j$.

The method 800 further includes transmitting $h_j$ from column controller $D_j$ to each row controller $C_i$ at block 802, and storing these values at each $C_i$.

The method 800 further includes reprogramming the weights in column j at block 803. This step comprises determining the new desired weights of synaptic nodes, for example by adding to the current weight an amount (c $v_i$ $h_j$) where c is a positive number, and implementing these new desired weights by reprogramming. The programming signal required to implement a new desired weight may be a function of the old weight as well as of the desired weight change. To determine the values of the weights in column j, for example, the output from controller $D_j$ is grounded. The controllers $C_i$ place voltages on the corresponding lines $A_i$, and measure the current through $w_{ji}$ to determine the value of $w_{ji}$. These values are stored in the controllers $C_i$, which then compute the required programming signals to change the old to the new value of $w_{ji}$. The required programming signals are then sent by the controllers $C_i$ to reprogram the column j weights. The programmed weights for column j may be read and iteratively reprogrammed until the actual and desired new weight values are sufficiently similar to each other. When reprogramming of column j is complete, column j is deselected (disabled) using line $B_j$.

The steps 801-803 are repeated for each column j.

The method 800 further includes computing $\tilde{v}_i$ for each row of the NN at block 804. For example, $\tilde{v}_i$ is computed using equation 11 described above. Thus, the row controllers $C_i$ of the NN are configured with nonlinear sigmoid amplifiers 107. In one embodiment, the $h_j$ terms stored in $D_j$ above are passed as inputs to the column lines, and using the weights of the crosspoint network, each $\tilde{v}_i$ is computed and stored in $C_i$ for all rows i at once. In another embodiment, each line i in turn is enabled using $U_i$. The $h_j$ terms stored in $D_j$ above are passed as inputs to the column lines. Using the weights of the crosspoint network, $\tilde{v}_i$ is computed and stored in $C_i$ for each row i.

The method 800 further includes computing $\tilde{h}_j$ for column j of a NN at block 805. For example, $\tilde{h}_j$ is computed based on Equation 12 above. Thus, column j is enabled using line $B_j$. Inputs $\tilde{v}_i$ of a NN are connected to rows $A_i$, and column controller $D_j$ is configured with a nonlinear sigmoid amplifier 107. The weights $w_{ji}$ of the synaptic nodes in column j of the crosspoint network are used to compute the linear combination $$\sum_i w_{ji}\tilde{v}_i.$$

The controller $D_j$ computes the nonlinear function $$\tilde{h}_j = \sigma\left(\sum_i w_{ji}\tilde{v}_i\right).$$

The computed $\tilde{h}_j$ is then stored at $D_j$.

The method 800 further includes transmitting $\tilde{h}_j$ from column controller $D_j$ to each row controller $C_i$ at block 806, and storing these values at each $C_i$.

The method 800 further includes reprogramming the weights in column j at block 807. This step comprises determining the new desired weights of synaptic nodes, for example by subtracting from the current weight an amount (c $\tilde{v}_i\tilde{h}_j$), and implementing these new desired weights by reprogramming. The programming signal required to implement a new desired weight may be a function of the old weight as well as of the desired weight change. To determine the values of the weights in column j, for example, the output from controller $D_j$ is grounded. The controllers $C_i$ place voltages on the corresponding lines $A_i$, and measure the current through $w_{ji}$ to determine the value of $w_{ji}$. These values are stored in the controllers $C_i$, which then compute the required programming signals to change the old to the new value of $w_{ji}$. The required programming signals are then sent by the controllers $C_i$ to reprogram the column j weights. The programmed weights for column j may be read and iteratively reprogrammed until the actual and desired new weight values are sufficiently similar to each other. When reprogramming of column j is complete, column j is deselected (disabled) using line $B_j$.

The steps 805-807 are repeated for each column j. The computation and weight updating for one presentation of input vector v to the NN is now complete.

In an alternative embodiment of the RBM algorithm, each $C_i$ is configured to store both $v_i$ and $\tilde{v}_i$, and each $D_j$ is configured to store both $h_j$ and $\tilde{h}_j$. The values of $h_j$, $\tilde{v}_i$, and $\tilde{h}_j$ are computed using the same set of $w_{ji}$ values. After each $\tilde{h}_j$ has been computed, and while column j is enabled, the values of $h_j$ and $\tilde{h}_j$ are sent along the CCS from $D_j$ to every $C_i$. Each row controller $C_i$ (in parallel with the other row controllers) computes the difference of products $(v_ih_j-\tilde{v}_i\tilde{h}_j)$, the resulting $\Delta w_{ji}$, and the desired new value of $w_{ji}$, and is used to reprogram the value of $w_{ji}$ and to iteratively reprogram it until the actual and desired new with $w_{ji}$ values are sufficiently close to each other in value. After this is done for the enabled column j, the next column is enabled and the process is repeated until the weights in all columns have been updated.

Figure 9:
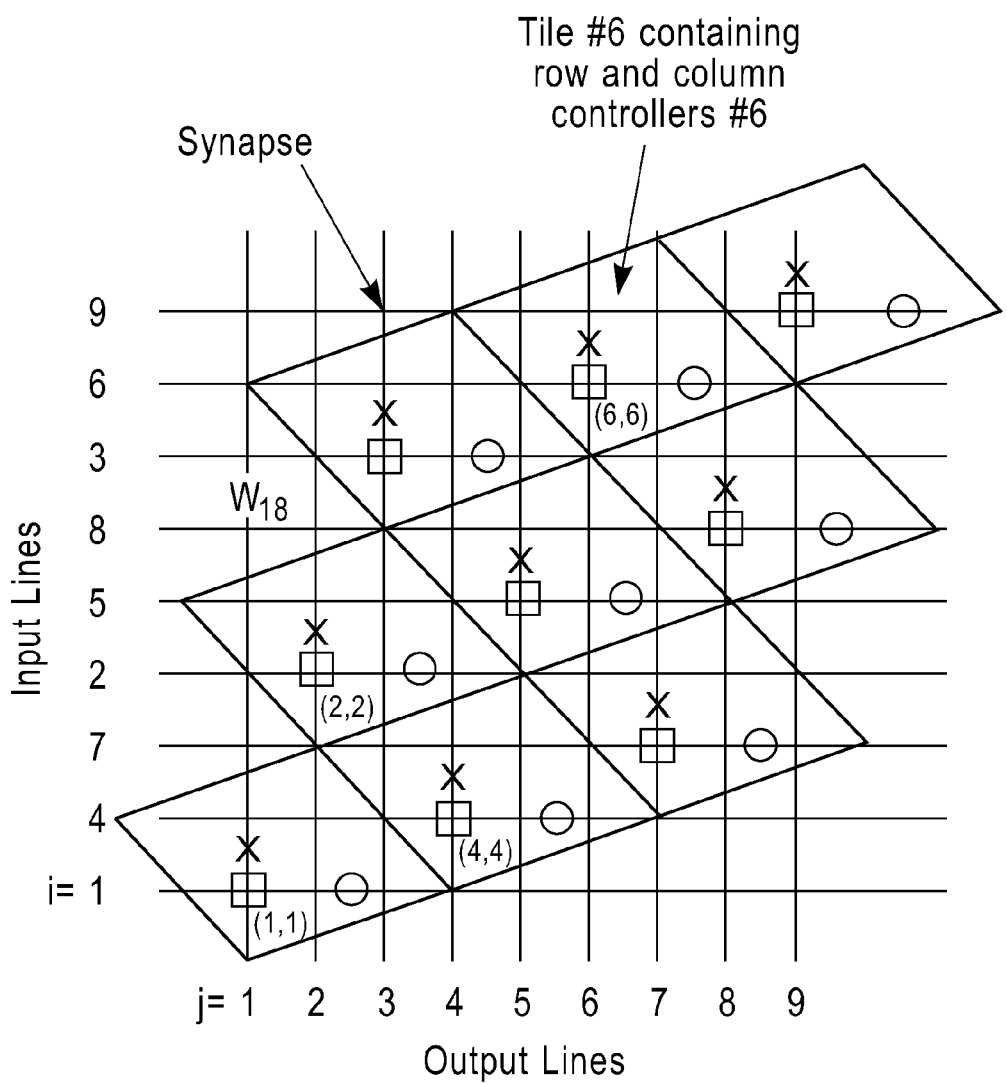
FIG. 9 is a schematic of a multi-layered circuit structure of a neural network, according to an example embodiment.

Turning now to FIG. 9, discussion of multi-layered structures is provided.

Likharev et al. ("A Reconfigurable Architecture for Hybrid CMOS/Nanodevice Circuits," D. B. Strukov and K. K. Likharev, in Proceedings of the 2006 ACM/SIGDA International Symposium on Field Programmable Gate Arrays, Monterey, Calif.; the entirety of which is hereby incorporated by reference herein) describe a geometry for layout of a layer of nanoscale elements A atop a layer of much larger microscale elements B, in which elements A are disposed at gridpoints of a square array and elements B are disposed in a grid pattern that is at larger scale than that of A, and is tilted by an angle with respect to A. Nanoscale contacts can be made between an element B and a selected one or more of overlying elements A.

According to an example embodiment of the present invention, row and column controllers are positioned and interconnected so that they span the area of the chip. This is beneficial if a synapse is much smaller than a controller, and when the synaptic array and its interconnections are placed in different layers of the multilayer circuit structure than are the controllers. The embodiment makes use of a larger-scale and a finer-scale array, one disposed atop, and tilted with respect to, the other in a multilayer circuit structure. This type of geometric layout is referred to herein as a "tilted tiling" layout. As is described more fully below, example embodiments provide a distinctive ordering of the input and output lines, the roles and positioning of the contacts between the two arrays, and the shape and layout of the microscale elements B, all of which enable advantageous functioning of the hardware network.

According to example embodiments, the synaptic crosspoint array may comprise N rows and N columns arranged in a square grid, where K, the square root of N, is an integer. If the desired number of neurons, called P, is not a perfect square, N may be chosen to be a perfect square greater than P. In a hardware implementation, any rows, columns, row controllers, and column controllers having index greater than P may then be either omitted or inactive. Similarly, there may be an unequal number of input and output neurons in a feedforward network. In this case, one may choose a perfect square number N that is at least as great as the larger of the number of input neurons and the number of output neurons. For ease of understanding, consider the example N=9, K=3 described here with reference to FIG. 9. As illustrated, columns are labeled by the indices 1, 2, 3, ..., 9 in order from "west" to "east" (the direction of the positive x axis). Rows are labeled by the indices 1, 4, 7, 2, 5, 8, 3, 6, 9 in order from "south" to "north" on this grid (the direction of the positive y axis). For general K, the ordering of row labels is 1, K+1, 2K+1, ..., K(K−1)+1; 2, K+2, 2K+2, ..., K(K−1)+2; ...; K, 2K, ... K²(=N). The positive "u" axis is defined as lying at a small angle z "north" of "east," and the positive "v" axis as lying at an angle z "east" of "north." The value of angle z is equal to the arctangent of (1/K). The intersection of row i and column j (and the synapse located at that intersection) is denoted by the pair of indices (j,i) in that order. A "tile" n is defined as a parallelogram centered at or near (and including within its area) a intersection (n,n). The vertices of the parallelogram (expressed as the displacements in x and y units, respectively, from the x and y values of the parallelogram's "southernmost" vertex) are, for the example K=3, (x,y)=(0,0), (3,1), (1,3), (−2,2). For general K these displacements are (x,y)=(0, 0), (K,1), (1,K), and (1−K,K−1). Two of the parallelogram's sides lie parallel to the u axis, and two lie along the "northwest"-"southeast" direction. All nearest-neighbor cells abut each other and form an array of tiled squares. Both the row controller i=n and the column controller j=n are placed in tile n. The column controller i=n (denoted by an "x" in FIG. 9) is placed slightly (e.g., half of the row pitch, in the drawing) "north" of the intersection (n, n) (which is denoted by a small square box), and the row controller j=n (denoted by a circle) is placed slightly (e.g., 1.5 column pitches, in the drawing) "east" of intersection (n, n). Then the tiles of each row (reading in the direction of increasing u) have numerical labels n that increase by K from one cell to its adjacent neighbor. Each tile contains one row controller and one column controller.

Note that the respective roles of rows and columns may be interchanged as this relates to the permutation of the integers 1 through N, and/or as this relates to the chosen direction along which the parallelogram is oriented. This may be done in conjunction with the interchanging of the roles of rows and columns in a two-stage (three neuron layer) neural network, depicted for example in FIG. 6 (wherein the row and column roles are interchanged for the second stage of the network, in the lower part of FIG. 6).

The particular "tilted tiling" example embodiment, having the numerical, permutational, and geometric relationships described above, offers several benefits.

A benefit includes that connections between column controller j=n and row controller i=n can be made within the same tile. This enables the operation of recurrent single-stage networks such as Hopfield networks, in which the output activity of neuron n at time step t becomes the input activity that neuron n provides to the rest of the network at time step t+1.

Another benefit includes that each controller is located near its corresponding row or column of the synaptic array, and may be directly connected to that row or column by a via passing through one or more layers of the multilayer circuit structure. If, as in some other example embodiments herein, the controllers are each at the end of a row or column (as in FIG. 2), then the controller circuit blocks either need to be extremely narrow (to fit within the inter-synaptic pitch), or staggered with respect to each other (to allow their width to be increased), or spread across a layer of the chip, with wires routed from the end of each row or column to the corresponding controller. In either of the latter two cases, wire length from controller to synaptic row or column is greater than in the current example embodiment.

Yet another benefit includes that the tiles can all be identical to one another, with the pads joining them to the synaptic rows and columns being placed at the same position within each tile. This is not the case with a variety of other "tilted tiling" layouts.

Note that variations may be made on the above example embodiment; the example embodiment is intended to cover all such modifications, equivalents, and alternatives falling within the scope of the example embodiment. For example, instead of the synaptic array forming a square grid, this array may form a rectangular grid, or a grid in which adjacent rows and columns form a parallelogram. Also, the inter-row or inter-column spacing need not be uniform across the synaptic grid. Also, one can take each row of tiles that lie along the u axis, and redefine the boundary edge between adjacent tiles so that each 135-degree edge is replaced by an edge at a more convenient angle (e.g., along the y-direction, or making at a 90-degree angle with the u axis). If this is done for multiple rows of tiles, the newly-defined edges will be offset (staggered) from one row to the next, instead of lying along parallel lines as in FIG. 9. The re-definition of the tile shapes should be made so as to ensure that each pair of controller pads lies within its original tile. Note that the re-defined tiles still have the important property that all the tiles can be identical in their circuitry layouts (i.e. with the controller pads in the same positions on each tile).

The controller communication system (CCS) should be able to communicate a digital message from each column controller j to all row controllers i (the same message independent of i). In the example embodiment shown in FIG. 2, the row controllers were shown as lying in a single column (to the left of the crosspoint array) and the column controllers as lying in a single row (below the bottom of the crosspoint array). In that case, it was efficient to run a single line through, or a single bus past, all of the controllers in turn. In the present embodiment, this would correspond to running a "boustrophedonic" (serpentine) line that passes through (or runs past) all N column controllers and all N row controllers. While this is one available option, there are others. In an alternative and more efficient (shorter total length) embodiment of the CCS layout, a serpentine line runs through (or past) both the row and column controllers of each tile, and passes through all the tiles in any desired sequence. In another alternative embodiment of the CCS layout, any wiring arrangement comprising a bus that connects all the row and column controllers may be used.

Hereinafter, interconnected neural networks spanning multiple chips, including interconnected systems using any of the neural nets described in detail above, are described.

Figure 10:
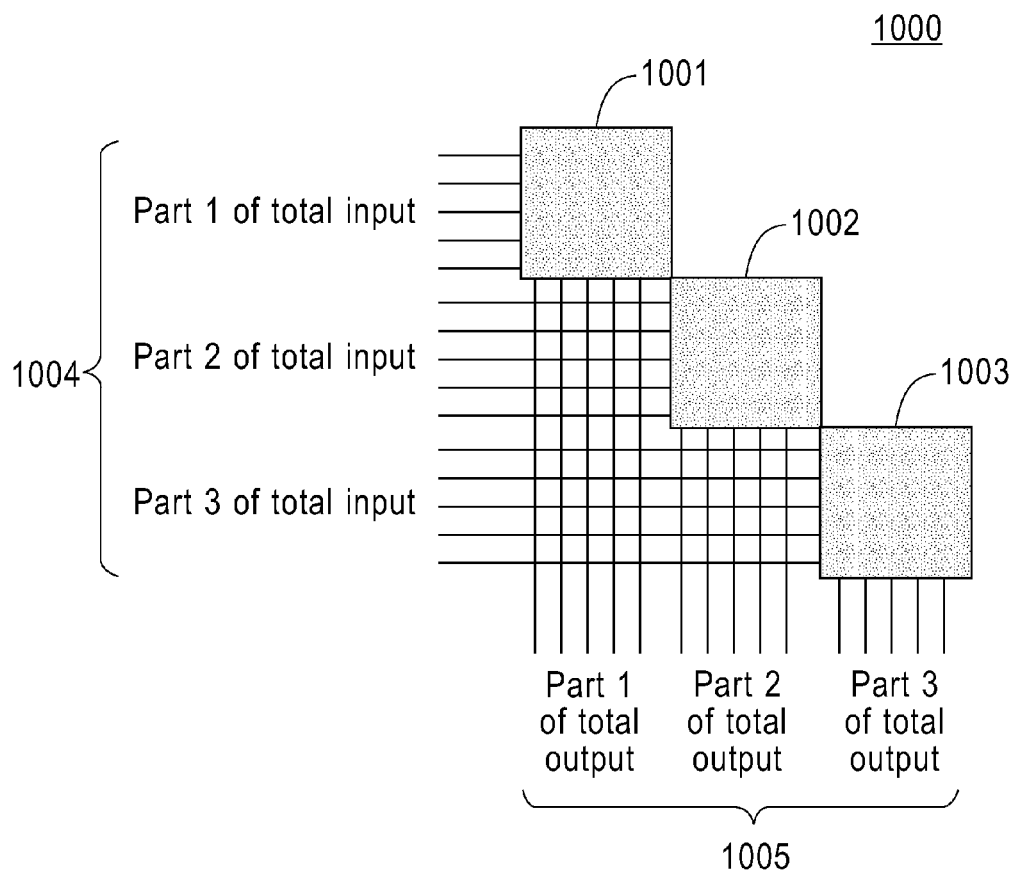
FIG. 10 is a schematic of interconnected neural networks, according to an example embodiment.

The connectivity between the input source and the NN on any one ADFFNN chip can be "local," where a subset of input source lines and their associated input controllers is connected only to a subset of output result lines and their associated controllers. The input sets of source data are disjoint, or have only limited overlap. Then each input-output set can be processed by a single chip. Where adjacent sets have limited overlap, a means of combining (e.g., by averaging) the weights corresponding to repeated connections (in the overlapping region) can be used. If there are MN inputs and MN outputs, and each chip can accommodate N inputs and N outputs, then with local connectivity the number of chips is approximately M. FIG. 10 shows this case. Each box in the grid is a ADFFNN chip with input and output lines shown (only 5 lines each are shown for discussion purposes). The total input is divided among all the ADFFNN chips and the total output is the collective output of all these chips.

Therefore, according to FIG. 10, a neural network system 1000 may include a plurality of feed-forward neural network arrays/chips 1001, 1002, and 1003. It is noted that although only three ADFFNN arrays are illustrated, any number may be suitable in any desired implementation. As illustrated, each ADFFNN array 1001, 1002, and 1003 is in communication with a localized portion of a set of inputs 1004 and outputs 1005 for the entire system 1000. Thus, each array of the plurality of arrays 1001, 1002, and 1003 provide analysis for a different portion of the inputs. However, example embodiments of the present invention are not limited to localized analysis and interconnection.

Figure 11:
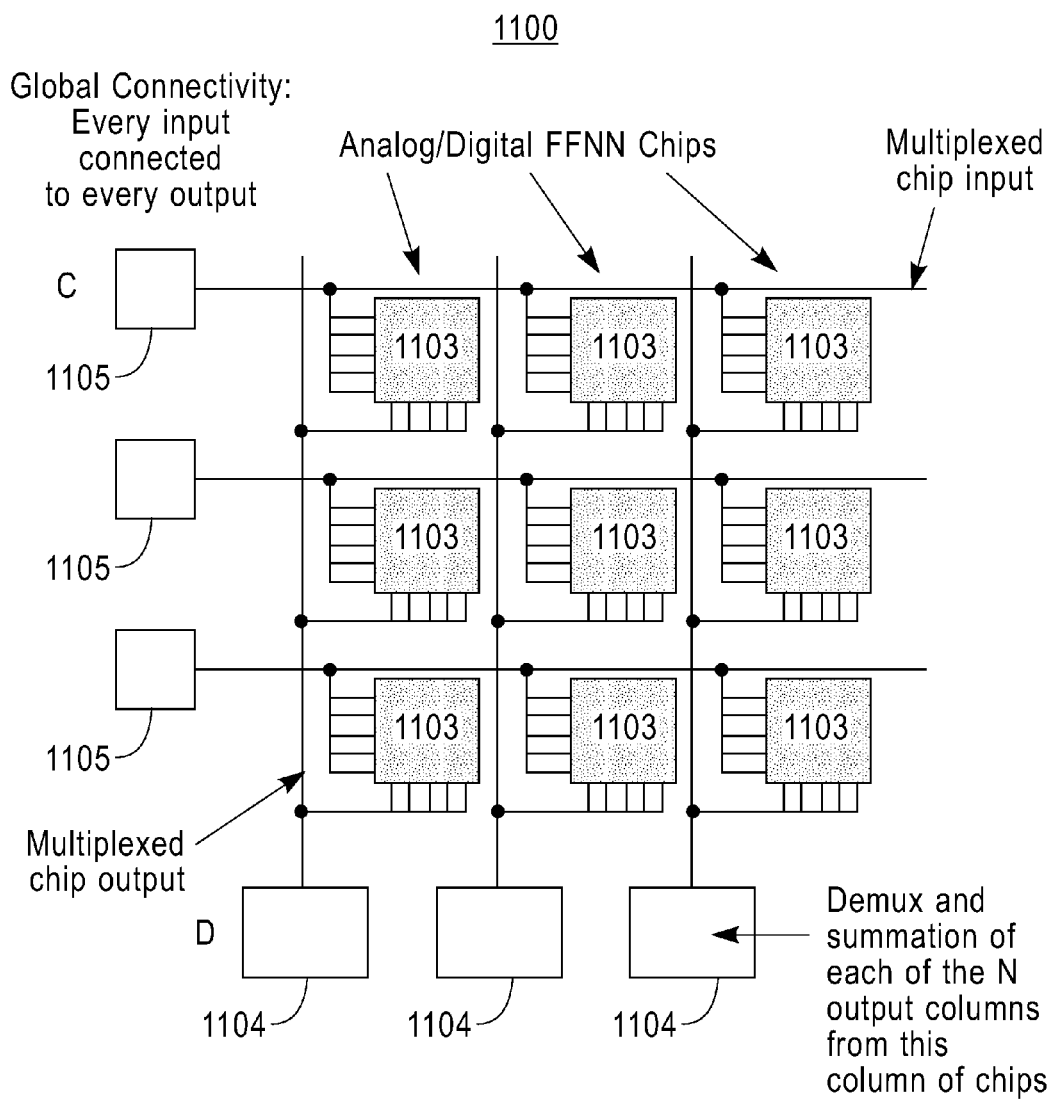
FIG. 11 is a schematic of globally interconnected neural networks, according to an example embodiment.

In addition, the connectivity between the input and output layers of an NN processing stage may be "global," where any input line can be connected to any output line. Then in general $M^2$ chips will be required. FIG. 11 shows an example layout of ADFFNN chips connected in this way (e.g., for one processing stage). The heavy lines contain bundles of wires with the various input or output signals for each chip. The boxes in the regular grid represent the ADFFNN chips and the boxes at the ends represent controllers, as discussed elsewhere. Each subset of N inputs will be provided to M chips lying in the same row. The N outputs from each of the M chips in the same column will be summed (before the nonlinear sigmoid function is applied) to yield N values. The sigmoid function is then applied to yield N outputs.

Thus, the system 1100 includes a plurality of ADFFNN arrays/chips 1103. Further, each ADFFNN of the plurality of ADFFNN 1103 is connected to respective inputs of a multiplexed chip input of the system 1100 facilitated through a plurality of input controllers 1105. Similarly, each ADFFNN of the plurality of ADFFNN 1103 is connected to respective outputs of a multiplexed chip output of the system 1100 facilitated through output controllers 1104. It is noted that the input controllers 1105 and the output controllers 1104 are arranged as column and row controllers of the system 1100. Thus, the system 1100 provides global connectivity, which every input connected to every output with a control scheme somewhat similar to the schemes described above for individual ADFFNN arrays.

As described above, a variety of neural network designs are provided which increase the density of hardware-implemented neural networks and overcome the inefficiencies related to software-implemented NN. These hardware-implemented NN may use PCM devices for programming interconnected at intersections of a plurality of rows and columns to create input and output networks of multi-layered NN devices. These multi-layered NN devices may be implemented on semiconductor substrates using vias to communicate across layers of the NN devices. Thus, increased density may be achieved.

The footprints of PCM device used in the disclosed NN devices, which themselves can be made very small, and normally lie at a BEOL level above the Si layer, are typically set by the programming FET dimension. Typically the area taken up by the programming FET is about 25 lithographic feature squares. As well as the PCM device built on the BEOL level, the vias and x- and y-lines lie in the space above the Si plane. Hence the estimate of synaptic density is based on the FET footprint, and at a 30 nm feature size will be about $3.6 \times 10^9$ $cm^{-2}$. The number of neurons (controllers) of each type, which is also the number of inputs, will be $6 \times 10^4$.

The RESET current of around 0.3 mA is on for only a few ns, giving an energy of ~1 pJ for RESET. A SET current of ~0.1 mA might be on for 50 ns, giving an energy of ~5 pJ. The overall programming energy is then ~5 pJ per step per synapse. Programming time, assuming worst-case 10 iterations to reach the correct multistate value of the weight, may be ~0.02 s per presentation of an input image. Faster times should be possible as the technology scales.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. An analog-digital crosspoint-network, comprising:
a plurality of rows and columns;
a plurality of synaptic nodes, each synaptic node of the plurality of synaptic nodes disposed at an intersection of a row and column of the plurality of rows and columns, wherein each synaptic node of the plurality of synaptic nodes includes a node-weight associated therewith;
a column controller associated with each column of the plurality of columns, wherein each column controller is disposed to enable a weight change at a synaptic node in communication with said column controller; and
a row controller associated with each row of the plurality of rows, wherein each row controller is disposed to control a weight change at a synaptic node in communication with said row controller.

2. The network of claim 1, wherein each synaptic node is disposed to change its associated node-weight as a result of interaction between each synaptic node and controllers associated with an intersection in communication with each synaptic node.

3. The network of claim 2, wherein a controller of a row including a synaptic node is disposed to output a weight change signal that is a function of both an existing weight at said synaptic node and a desired weight change.

4. The network of claim 3, wherein feedback means are provided to iteratively improve the approximation of actual weight change to the desired weight change at said synaptic node.

5. The network of claim 1 wherein each synaptic node includes a plurality of sub-weight elements, the node-weight of each synaptic node is a function of sub-weights of the synaptic node, and each sub-weight has value equal to one of at least two specified values.

6. The network of claim 5 wherein said node-weight function is the summation of the plurality of sub-weights, and one of the specified values for each sub-weight is zero.

7. The network of claim 6 wherein nonzero specified values at a synaptic node are different for each sub-weight of the plurality of sub-weights.

8. The network of claim 7 wherein said nonzero specified sub-weight values are in the ratios $1:2:4: \ldots :2^{(N-1)}$ where N is the number of sub-weights at the node.

9. The network of claim 1 wherein each synaptic node may store any selected value from among a plurality of values, the node-weight being said selected value, and zero being one of the plurality of values.

10. The network of claim 1 further comprising a controller communication system (CCS) disposed to select one column or one row at a time.

11. The network of claim 1 wherein a CCS is disposed to transmit at least one signal from a column controller to at least one of the row controllers.

12. The network of claim 11 wherein said at least one signal represents a value of a nonlinear function of a weighted linear combination of row inputs to the synaptic nodes associated with said column.

13. The network of claim 12 wherein
each row controller receives information about the node-weight for a synaptic node on its row and in a selected column;
each row controller computes a desired weight change for the synaptic node;
each row controller stores an existing node-weight for the synaptic node;
each row controller outputs a row signal that is a function of both the existing node-weight and the desired weight change for the synaptic node;
each column controller is disposed to transmit a second signal configured to enable an associated column;
each column controller is disposed to transmit a third signal configured to enable a node-weight readout; and
each synaptic node of the enabled column alters a value of its respective node-weight in response to the row signal and the second signal.

14. The network of claim 13 wherein the synaptic node undergoes a change in material properties in response to the row signal.

15. The network of claim 13 wherein each synaptic node comprises a phase change material device (PCM), and weight change of each synaptic node is effected by specified pulse heating or pulse pressure.

16. A neural network comprising an analog-digital crosspoint-network, the analog-digital crosspoint-network comprising:

a plurality of rows and columns;

a plurality of synaptic nodes, each synaptic node of the plurality of synaptic nodes disposed at an intersection of a row and column of the plurality of rows and columns, wherein each synaptic node of the plurality of synaptic nodes includes a weight associated therewith;

a column controller associated with each column of the plurality of columns, wherein each column controller is disposed to enable a weight change at a synaptic node in communication with that column controller; and a row controller associated with each row of the plurality of rows, wherein each row controller is disposed to control a weight change at a synaptic node in communication with that row controller;

wherein both feedforward and feedback neural network matrices are determined through the network, and wherein a feedback weight matrix is the matrix transpose of a feedforward weight matrix.

17. A multistage neural network comprising a plurality of analog-digital crosspoint-networks, each network of the plurality of analog-digital crosspoint-networks comprising:

a plurality of rows and columns;

a plurality of synaptic nodes, each synaptic node of the plurality of synaptic nodes disposed at an intersection of a row and column of the plurality of rows and columns, wherein each synaptic node of the plurality of synaptic nodes includes a weight associated therewith;

a column controller associated with each column of the plurality of columns, wherein each column controller is disposed to enable a weight change at a synaptic node in communication with that column controller; and a row controller associated with each row of the plurality of rows, wherein each row controller is disposed to control a weight change at a synaptic node in communication with that row controller;

wherein a nonlinear column or row value from each stage of the multistage neural network is disposed as the row or column input value to an adjacent stage.

* * * * *